X 2081
T. Gregg.
Armor Clad.
Patented Mar. 19, 1814.
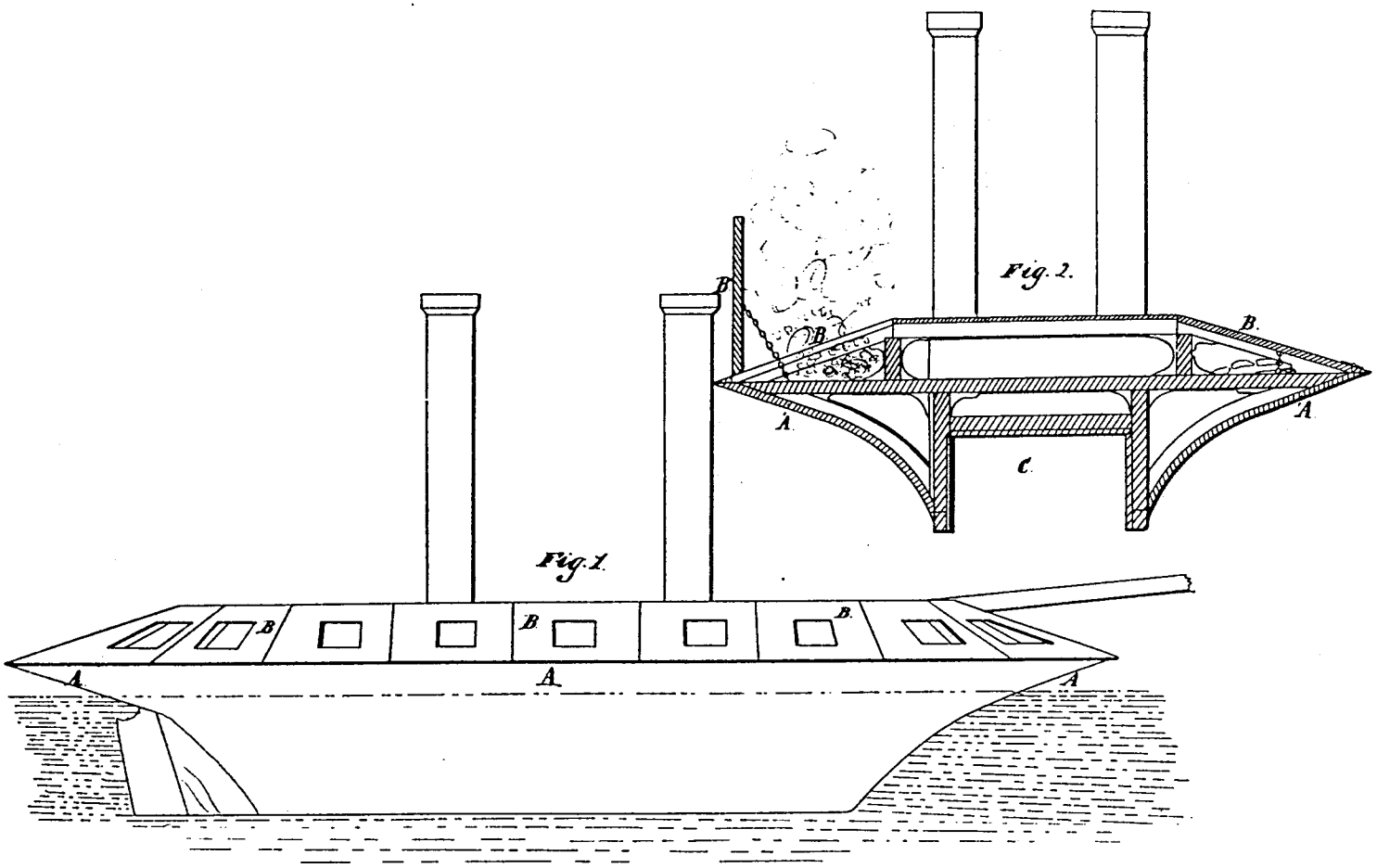
N. PETERS, PHOTO-LITHOGRAPHER, WASHINGTON, D. C.

MISSING PAGE TEMPORARY NOTICE

PATENT # X 2081 FOR ISSUE DATE 3-19-1814

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

ALL DESCRIPTION